United States Patent [19]

Babu et al.

[11] Patent Number: 5,296,561
[45] Date of Patent: Mar. 22, 1994

[54] MOISTURE-CURABLE POLYOLEFIN PRESSURE-SENSITIVE ADHESIVE

[75] Inventors: Gaddam N. Babu, Woodbury; James R. Peterson, St. Paul; Sehyun Nam, Woodbury, all of Minn.

[73] Assignee: Minnesota Mining and Manufacturing Company, St. Paul, Minn.

[21] Appl. No.: 36,433

[22] Filed: Mar. 24, 1993

Related U.S. Application Data

[60] Division of Ser. No. 966,592, Oct. 26, 1992, Pat. No. 5,227,442, which is a continuation of Ser. No. 585,227, Sep. 19, 1990, abandoned.

[51] Int. Cl.$^5$ ............ C08F 8/00; B05D 5/10; C08J 3/28; C08K 3/30
[52] U.S. Cl. .................. 525/342; 522/127; 524/421; 524/423; 524/429; 524/400; 524/405; 524/444; 427/208.4
[58] Field of Search ............ 526/154, 279, 348.8; 525/342; 522/127; 524/400, 405, 421, 423, 429, 444; 427/208.4

[56] References Cited

U.S. PATENT DOCUMENTS

| | | | |
|---|---|---|---|
| 3,542,717 | 11/1970 | Lipman | 260/27 |
| 3,635,755 | 1/1972 | Balinth et al. | 117/122 P |
| 3,954,697 | 5/1976 | McConnell et al. | 526/350 |
| 4,178,272 | 12/1979 | Meyer, Jr. et al. | 260/27 R |
| 4,288,358 | 9/1981 | Trotter et al. | 260/31.8 |
| 4,687,818 | 8/1987 | Kawakubo et al. | 525/404 |
| 4,759,992 | 7/1988 | Tomko et al. | 428/447 |
| 5,112,882 | 5/1992 | Babu et al. | 522/158 |
| 5,194,501 | 3/1993 | Babu et al. | 525/103 |
| 5,202,361 | 4/1993 | Zimmerman et al. | 522/120 |
| 5,209,971 | 5/1993 | Babu | 428/343 |

FOREIGN PATENT DOCUMENTS

| | | |
|---|---|---|
| 0224795 | 6/1987 | European Pat. Off. |
| 0321258 | 6/1989 | European Pat. Off. |
| 0321259 | 6/1989 | European Pat. Off. |
| 59-183886 | 10/1984 | Japan |

*Primary Examiner*—Joseph L. Schofer
*Assistant Examiner*—Wu C. Cheng
*Attorney, Agent, or Firm*—Gary L. Griswold; Walter N. Kirn; Lorraine R. Sherman

[57] ABSTRACT

A pressure-sensitive adhesive comprises a moisture-curable polymer comprising a polymer prepared by polymerization of at least one α-olefin monomer, said polymer containing hydrolyzable or condensable silyl groups and having a weight average molecular weight of at least 30,000. The pressure-sensitive adhesive can be hot-melt coated without emitting volatiles and then can adhere aggressively to both polar and nonpolar substrates. The PSA has good internal strength at high temperatures.

12 Claims, No Drawings

MOISTURE-CURABLE POLYOLEFIN PRESSURE-SENSITIVE ADHESIVE

This is a division of application Ser. No. 07/966,592, filed Oct. 26, 1992, U.S. Pat. No. 5,227,442, which is a continuation of U.S. Ser. No. 07/585,227, filed Sep. 19, 1990, abandoned.

BACKGROUND OF THE INVENTION

1. Field of the Invention

This invention relates to pressure-sensitive adhesives that have good internal strength at high temperatures. The invention provides pressure-sensitive adhesives that can be coated without evolution of organic matter to provide tapes which are substantially odor-free and physiologically inert.

2. Description of the Related Art

When considering adhesive tapes, pressure-sensitive adhesive (PSA) tapes are the easiest to use, but for the most part, pressure-sensitive adhesives do not adhere well to nonpolar substrates. Another shortcoming is that most PSAs are unsuited for uses requiring good internal strength at elevated temperatures. For example, rubber-resin PSAs tend to soften and degrade when heated. PSAs based on styrene-containing block copolymers also do not retain good internal strength when heated, because styrene has a low $T_g$ and so softens at moderately elevated temperatures. Acrylate PSAs tend to give off toxic vapors at elevated temperatures. They typically contain monomeric materials which, even at ordinary room temperatures, exude odors that make acrylate PSA tapes generally unsuitable for medical uses. Polyisobutylene PSAs are often employed for medical uses because they are physiologically inert, but they tend to be deficient in internal strength.

PSAs are usually coated from solution or emulsion, thus releasing organic matter which would pollute the atmosphere unless recovered. Recovery apparatus is expensive and can be dangerous when used to recover inflammable solvents. Hence, it is preferable, when feasible, to hot-melt coat a PSA.

Of known PSAs, silicones best retain high internal strength at elevated temperatures, but known silicone P$As must be coated from organic solvents. Typically, a metal catalyst is employed to initiate a reaction between gum and resin components, especially when good internal strength at elevated temperatures is required. Most effective are tin catalysts, the toxic nature of which prevents the resulting PSAs from being used in many important applications such as those involving food or medical needs. In spite of such problems and their high price, silicone PSA tapes are used where good internal strength at high temperatures is of utmost importance, e.g., as electrical insulating tapes and as masking tapes for use with paints to be baked at high temperatures.

PSAs can be based on α-olefin polymers. For example, U.S. Pat. No. 3,635,755 describes PSAs made from homopolymers of $C_6$ to $C_{11}$ α-olefins or from interpolymers $C_2$ to $C_{16}$ α-olefins. These tapes are said to show substantially no irritation to skin and to have low shear adhesions that facilitate non-irritating removal from the human skin.

After noting that prior PSAs based on α-olefin polymers had very poor cohesive (internal) strength, U.S. Pat. No. 3,954,697 discloses that PSAs provided by copolymers of polypropylene and $C_6$ to $C_{10}$ α-olefins can be hot-melt coated at a melt temperature of at least 350° F. (177° C.) so that the copolymers exhibit no detectable crystallinity by either X-ray or DSC techniques. Nothing is said about cohesive strengths at elevated temperatures.

U.S. Pat. No. 4,288,358 discloses that a PSA adhesive based on α-olefin polymers can be hot-melt coated and can have good resistance to shear adhesion failure, i.e., good internal strength. This is accomplished by blending at least one $C_6$ to $C_{10}$ linear α-olefin polymer with a plasticizing oil and a tackifying resin. Nothing is said about internal strength at elevated temperatures.

Another publication of PSAs based on α-olefin copolymers wherein the monomers have up to 20 carbon atoms is U.S. Pat. No. 3,542,717.

U.S. Pat. No. 4,178,272 discloses that a hot-melt adhesive which provides strong T-peel and lap shear bonds can be made using α-olefin polymers. The hot-melt adhesive disclosed in this reference is a blend of poly(propyleneco-higher 1-olefin), tackifying resin, and crystalline polypropylene. The blend is not said to be tacky or provide a PSA. In Example 1, the bonds are made at 200° C.

Another method of producing α-olefin polymers of good internal strength involves grafting silanes onto the polymers as in U.S. Pat. No. 4,759,992. The '992 patent relates to applying protective coatings to weatherable substrates such as wood, brick and concrete. The reference teaches moisture-curable silane-substituted α-olefin polymers that are of low molecular weight as evidenced by a vicosity average molecular weight of between about 500 and about 20,000.

SUMMARY OF THE INVENTION

Briefly, the PSA of the invention provides a moisture-curable polymer which is a PSA both before and after being moisture cured and comprises a polymer prepared by polymerization of at least one α-olefin monomer, the polymer comprising hydrolyzable or condensable silyl groups and having a weight average molecular weight of at least 30,000.

The present invention provides a pressure-sensitive adhesive which can have good internal strength at elevated temperatures while avoiding the aforementioned problems. Because of this, the novel PSA can be used for making automotive masking tapes and other tapes requiring good strength at elevated temperatures.

Advantages of the novel PSA include
1) the ability to be hot-melt coated without emitting volatiles,
2) being odor-free,
3) being physiologically inert and hence non-allergenic, and
4) the ability to adhere aggressively to both polar and nonpolar substrates.

Furthermore, large-scale production can produce the novel PSA and PSA tapes at costs comparable to that of any major PSA now on the market.

In this application:

"alpha-olefin polymer" means a polymer prepared by polymerization of at least one α-olefin monomer;

"halo" means chloro or bromo,

"Ziegler-Natta (Z-N) catalyst" means a coordination initiator or catalyst having the properties described by Seymour and Carraher, "Polymer Chemistry", page 296, Mercel Dekker, Inc., N.Y. (1988).

DETAILED DESCRIPTION OF THE PREFERRED EMBODIMENTS

Preferably, in the PSA of the invention, the novel moisture-curable α-olefin polymer has a hydrocarbyl backbone and the general formula:

$$(M^1)_x-(M^2)_y-(M^3)_z \quad \text{I}$$

wherein x, y, and z are numbers designating the relative molar amounts of $M^1$, $M^2$, and $M^3$ units that are randomly located in the backbone chain of the polymer such that the polymer has a weight average molecular weight of at least 30,000, x is at least 60% of x+y wherein y can be 0, and z is 0.1 to 10% of x+y+z;

$M^1$ is a repeat unit present in a polymer formed upon polymerization of an α-olefin having 6 to 14 carbon atoms;

$M^2$ is a saturated or unsaturated repeat unit present in a polymer formed upon polymerization of ethylenically-unsaturated hydrocarbons selected from α-olefins having 2 to 20 carbon atoms, non-conjugated dienes having 5 to 20 carbon atoms, and non-conjugated mono- and polyethylenically-unsaturated mono-and polycyclic hydrocarbons having 6 to 20 carbon atoms;

$M^3$ is the same as $M^2$ but is substituted by a hydrolyzable or condensable silyl group;

Most preferably, the novel moisture-curable α-olefin polymer has the general formula:

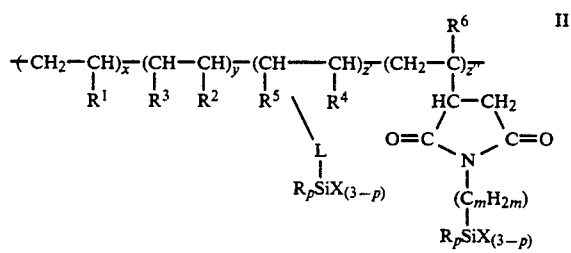

wherein $R^1$ is an alkyl group having 4 to 12 carbon atoms, preferably 4 to 8 carbon atoms, and most preferably about 4 to 6 carbon atoms;

$R^2$ is hydrogen or a hydrocarbyl group selected from alkyl groups having 1 to 18 carbon atoms and aryl groups having 6 to 12 carbon atoms;

$R^3$ is preferably hydrogen or together with $R^2$ and the carbon atoms to which they are attached is a saturated or unsaturated monocyclic or polycyclic ring system having 6 to 20 carbon atoms;

x, y, z', and z" are numbers designating the relative molar amounts of x, y, z', and z" that are randomly located in the backbone chain of the polymer such that the polymer has a weight average molecular weight of at least 30,000, x is at least 60% of x+y wherein y can be 0, and z'+z" is 0.1 to 10% of x+y+z'+z", and z" can be 0; z, and z"=z, in which z is defined above.

$R^4$ is a hydrocarbyl group selected from alkyl groups having 1 to 18 carbon atoms and aryl groups having 6 to 12 carbon atoms;

$R^5$ is hydrogen or together with $R^4$ and the carbon atoms to which they are attached forms a saturated or unsaturated monocyclic or polycyclic ring system; the same as disclosed above for $R^3$;

$R^6$ is an alkyl group having 4 to 18 carbon atoms;

L designates a coordinate bond or the divalent group

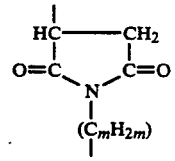

that joins $R_pSiX_{(3-p)}$ either directly to a carbon atom in $R^4$ or to a carbon atom of the ring system formed by $R^4$ and $R^5$;

m is an integer having a value 1 to 6, preferably 3;

R is a hydrocarbyl group selected from alkyl groups having 1 to 18 carbon atoms (preferably methyl or ethyl), aryl groups having 6 to 8 carbon atoms, and cycloalkyl groups having 5 to 8 carbon atoms;

X is a hydrolyzable or condensable atom or group selected from hydrogen, hydroxy, halogen; hydrocarbyloxy and hydrocarbonyloxy having 1 to 5 carbon atoms, preferably 1 to 3 carbon atoms; and p is zero, one or two.

Preferably, p is 0 and each X of the hydrolyzable or condensable silyl group is a hydrocarbyloxy group (more preferably an alkoxy group), because this enhances the moisture-curability of the novel α-olefin polymer.

In the presence of moisture, the pedant silyl groups, preferable alkoxysilyl groups, of the novel moisture-curable polymer hydrolyze to silanols that split off water to form a Si—O—Si crosslinked network.

When $R^1$ contains from 4 to 8 carbon atoms, the novel moisture-curable α-olefin from is a tacky PSA at ordinary room temperatures (e.g., 20°-25° C.). When $R^1$ contains from 9 to 12 carbon atoms, the novel α-olefin polymer is not normally tacky but become tacky when heated to moderately elevated temperatures (e.g., above 25° to 100° C.) and normally loses that tackiness when cooled to ambient temperature (e.g., 20°-25° C.). While tacky, it can form strong bonds under fingertip pressure. When $R^1$ contains from 9 to 12 carbon atoms and $R^2$ is an alkyl group of from 1 to 8 carbon atoms, the novel α-olefin polymer may be slightly tacky at ordinary room temperatures. For some uses, the ability of a PSA to become tacky only when heated is an important advantage.

The preferred ratio of x plus y groups to z'+z" groups is from 20:1 to 200:1 (i.e., 0.5 to 5 mole % z'+z" groups present in the polymer). As that ratio increases (percentage of z'+z" groups decreases), the novel α-olefin polymers have increased tackiness, but as that ratio decreases, they have increased internal strength. Hence, that ratio should be selected to afford the desired balance of tackiness and cohesive strength. For most uses, the best balance is attained when the ratio is between 30:1 and 100:1 (i.e., between about 0.3 and 3.2 mol % z'+z" groups present in the polymer). Tackiness can also be increased, or an otherwise non-tacky moisture-curable α-olefin polymer of the invention can be made tacky, by blending it with tackifying resin.

Preferably, a moisture-curable α-olefin polymer of the invention has a $T_g$ not higher than 0° C., more preferably not higher than $-20°$ C., and its $T_g$ can be as low as $-60°$ or $-70°$ C.. A novel PSA α-olefin polymer that has a low $T_g$ tends to have superior adhesion. Furthermore, an α-olefin polymer with a lower $T_g$ can be blended with larger amounts of tackifying resin to make coatings that are less shocky.

Preferably, the novel moisture-curable α-olefin polymer has an inherent viscosity (IV) in hexane in the range of 0.5 to 3 dl/g, which values roughly correspond to average molecular weights of from 50,000 to 3,500,000, respectively. Within that preferred range of inherent viscosities, the α-olefin polymer can be hot-melt coated. At an IV substantially below that preferred range, the α-olefin polymer would be less likely to attain high internal strength, especially at elevated temperatures. At viscosities substantially higher than 3 dl/g, the α-olefin polymer can be coated from solution. At an IV above 5 dl/g, it may be necessary to employ a solution that is too dilute to be commercially practical.

The novel moisture-curable α-olefin polymer can be produced from commercially available starting materials by any of several methods. A first method involves the steps of:

a) copolymerizing a $C_6$ to $C_{14}$ α-olefin monomer with an ω-alkenylhalosilane or ω-alkenylalkoxysilane (wherein the alkenyl group has 2 to 20 carbon atoms) using a Z-N (Ziegler-Natta) catalyst to produce a copolymer containing halosilyl or alkoxysilyl side chains (preferably chlorosilyl side chains), and b) when the resulting copolymer contains halosilyl side chains, reacting the copolymer with an alcohol to afford alkoxysilyl side chains.

Preferably the alcohol is methanol or ethanol because hydrolysis may proceed too slowly when using higher alcohols.

The preferred Ziegler-Natta catalysts are complexes of alkylaluminum together with a halide of a transition metal from group IV to group VIII of the Periodic Table in which the alkylaluminum is a compound such as triethylaluminum, tributylaluminum, diethylaluminum chloride, and dibutyl aluminum chloride and the transition metal halide is a compound such as titanium trichloride, titanium tetrachloride, vanadium trichloride, vanadium tetrachloride, and vanadium oxytrichloride. The preferred catalyst system is diethylaluminum chloride/aluminum activated titanium trichloride which is commercially available (Stauffer Chemical Co.).

Preferably, in the novel α-olefin polymer produced by this first method, $M^3$ has the formula:

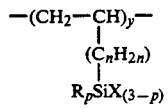

III wherein n is an integer in the range of 3 to 18, preferably 3 to 6, and R, X and p are as defined above.

A second method involves the steps of:

a) copolymerizing a $C_6$ to $C_{14}$ α-olefin monomer with a nonconjugated linear, mono-, or polycyclic diene using a Z-N catalyst to produce a copolymer containing pendant and/or terminal ethylenic-unsaturation and b) in the presence of a catalyst, preferably a Pt-containing catalyst, hydrosilating the ethylenic unsaturation with a hydrosilane of the formula

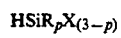

wherein X, R and p are as defined above. Hydrosilation catalysts, e.g., organometallics, or rhodium- or platinum-containing catalysts, are well known in the art and are commercially available.

In the novel α-olefin polymer produced by this second method, $M^3$ has the same structure III above when the diene is linear and, when the diene is cyclic, $M^3$ has a structure; such as, for example:

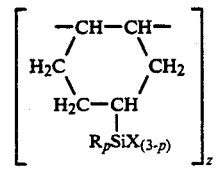

IV and

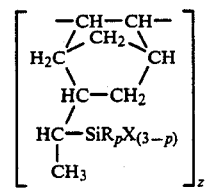

A third method involves the steps of:

a) copolymerizing a $C_6$ to $C_{14}$ α-olefin monomer with a nonconjugated linear, mono-, or polycyclic diene using Z-N catalyst to produce a copolymer containing pendant and/or terminal ethylenically-unsaturated chains, and b) in the presence of an initiator such as peroxide, or by UV radiation in the presence of a photoinitiator, adding a mercaptoalkylalkoxysilane, preferably mercaptopropyltriethoxysilane, to the ethylenic-unsaturation of the side chains.

In the novel α-olefin polymer produced by this third method, $M^3$ has structures such as,

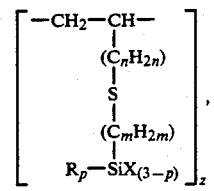

V

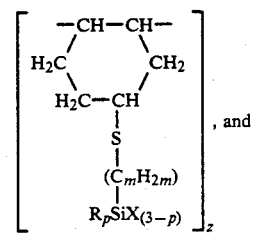

, and

-continued

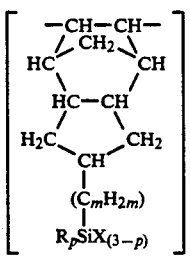

wherein R, p, X, and n are as previously defined, m is an integer in the range of 1 to 6, preferably 3. Because of its sulfur bridge, the resulting α-olefin polymer is not as stable at elevated temperatures as is that produced by the second method.

A fourth method involves the steps of a) polymerizing one or more $C_6$ to $C_{14}$ α-olefin monomers alone or with up to 40 mole % of one or more $C_2$ to $C_5$ α-olefin monomers or aromatic olefins using a Z-N catalyst to produce a saturated homopolymer or copolymer, b) reacting the resulting α-olefin polymer with maleic anhydride in the presence of a catalyst, preferably a peroxide catalyst and preferably an electron donor (e.g., triphenyl phosphite or triethyl phosphate) to produce an adduct, and c) reacting the maleated α-olefin polymer adduct with aminoalkylalkoxysilane, preferably aminopropyltriethoxysilane, or with isocyanatoalkylalkoxysilane, preferably isocyanatopropyltriethoxysilane, either in solution or in a melt, e.g., in an extruder.

In the novel moisture-curable α-olefin polymer produced by the fourth method, $M^3$ has structures such as, for example:

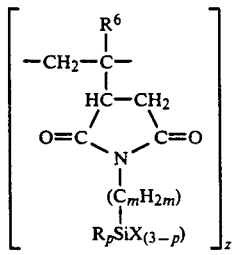

wherein
$R^6$, m, p, R, X, z are as previously defined.

In step b) of the fourth method, when the starting polymer is a homopolymer, the maleic anhydride attaches to the tertiary carbon by hydrogen abstraction in the presence of an initiator, such as a peroxide, which preferably is dibenzoylperoxide. When the starting polymer is a copolymer of propylene and a higher α-olefin of from 6 to 10 carbon atoms, the maleic anhydride preferentially attaches to the carbon containing the methyl group. When the starting polymer is a copolymer containing a nonconjugated diene, the maleic anhydride preferentially goes to the allylic position.

A fifth method involves the steps of:

a) polymerizing a $C_6$ to $C_{14}$ α-olefin monomer alone or with up to 40 mole % of one or more $C_2$ to $C_5$ α-olefin monomers using a Z-N catalyst to produce a saturated homopolymer or a copolymer, b) reacting maleic anhydride with aminoalkylalkoxysilane or with isocyanatoalkylalkoxysilane (as disclosed previously) to produce imidoalkylalkoxysilane, and c) reacting the α-olefin polymer produced in step a) with the imidoalkylalkoxysilane in the presence of an initiator such as a peroxide and preferably an electron donor such as a dialkylphosphite, preferably diethylphosphite or dibutylphosphite, either in solution or in melt.

In the novel moisture-curable α-olefin polymer produced by the fifth method, the structure of $M^3$ is the same as that produced by the fourth method.

Alpha-olefins that can be used in preparing an ethylenically-unsaturated α-olefin polymer of the invention can have from 2 to 14 carbon atoms. Representative examples include, but are not limited to, ethylene, propylene, 1-butene, 1-pentene, 1-hexene, 1-heptene, 1-octene, 1-tetradecene; branched olefins such as 3-methyl-1-butene, 3,3-dimethyl-1-butene, 4-methyl-1-pentene, and 3-ethyl-1-pentene; cyclic olefins such as cyclopentene, cyclohexene, 3-methylcyclopentene, 4-n-butylcyclohexene, bicyclo[2.2.1]hept-2-ene, 1,7,7-trimethylbicyclo[2.2.1]hept-2-ene (bornylene) bicyclo[3.2.0-]hept-2-ene, bicyclo[3.2.0]hept-6-ene,bicyclo[2.2.0]oct-2-ene, and tricyclo[3.2.2]non-6-ene; and aromatic olefins such as allylbenzene, 1H-indene, 3-methyl-1H-indene, and styrene.

Non-conjugated dienes that can be used in the α-olefin polymer of the invention have 5 to 14 carbon atoms. Representative examples include, but are not limited to, 1,4-pentadiene, 1,5-hexadiene, 1,6-heptadiene, 1,7-octadiene, 1,13-tetradecadiene, 1,19-eicosadiene, and the like; cyclic dienes such as 1,4-cyclohexadiene, bicyclo[2.2.1]hept-2,5-diene, bicyclo[2.2.2]oct-2,5-diene, 4-vinylcyclohex-1-ene, bicyclo[2.2.2]oct-2,6-diene, 1,7,7-trimethylbicyclo[2.2.1]hept-2,5-diene, dicyclopentadiene, 5-allylbicyclo[2.2.1]hept-2-ene, 1,5-cyclooctadiene; and aromatic dienes such as 1,4-diallylbenzene, 4-allyl-1H-indene and the like.

Moisture-curable α-olefin polymers produced by each of the five foregoing methods can be hot-melt coated onto flexible backings without evolution of volatile matter to produce PSA tapes of the invention. The PSA coatings of the resulting tapes can be hydrolyzed to form a Si—O—Si crosslinked network simply upon being exposed to the moisture of the atmosphere. Faster crosslinking is achieved in the presence of a silanol condensation catalyst. Suitable catalysts include organic metal compounds such as tin carboxylates and titanium esters or chelates, e.g., tetrabutyltitanate and bis(acetylacetonyl)di-isopropyl titanate; organic bases such as ethylamine, hexylamine and piperidine; and acids such as the mineral acids and fatty acids. The preferred catalysts are the organic tin compounds, for example, dibutyltindilaurate, dibutyltindiacetate and dibutyltindioctoate. Typically, such catalysts are added in amounts between one part to about 3 parts by weight per 100 parts by weight of the moisture-curable α-olefin polymer.

In the absence of a silanol condensation catalyst, hydrolysis proceeds slowly at low relative humidity (less than 50% relative humidity), so that it may be desirable to subject the coated tapes to conditions of high relative humidity (at least 50%) and moderately elevated temperature (e.g., 30° to 100° C.), preferably immediately following the coating step. Instead, the coating can be caused to pick up moisture (e.g., by being exposed to steam), and the moisture-bearing tape can be wound up into a jumbo roll, wherein the support can have a release coating on its backside, which is then heated in an oven until the PSA coating has become moisture-cured. Another technique involves blending a novel α-olefin polymer with one to ten weight percent, preferably one to two weight percent of a hydrated salt prior to coating and later heating the tape to produce the moisture-curing, either while the tape is in roll form or after it has been put to use. Suitable hydrated salts include $CaSO_4.5H_2O$, $MgSO_4.7H_2O$, $BaSO_4.2H_2O$, $(CH_3COO)_2Ba.2H_2O$, $BaCl_2.2H_2O$, $CaSO_4.2H_2O$, $Na_2B_4O_7.10H_2O$, $AlNH_4(SO_4)_2.12H_2O$, $Al(OH)_3.XH_O$, $Al(NO_3)_3.9H_2O$, and $Al_2(SO_4)_3.16H_2O$.

A blend of the novel α-olefin polymer with a tackifying resin can have lower viscosity and thus be more readily hot-melt coated, and the resulting coatings can have greater tackiness and peel adhesion as compared to coatings of the novel α-olefin polymer alone. The inclusion of tackifying resin also tends to enhance internal strength. Useful tackifying resins include resins derived by polymerization of $C_5$ to $C_9$ unsaturated hydrocarbon monomers, polyterpenes, synthetic polyterpenes and the like. Hydrocarbon tackifying resins can be prepared by polymerization of monomers consisting primarily of olefins and diolefins and include, for example, residual by-product monomers of the isoprene manufacturing process. These hydrocarbon tackifying resins typically exhibit Ball and Ring softening points from about 80° C. to about 145° C.; acid numbers from about 0 to 2, and saponification values of less than one. Examples of such commercially available resins based on a $C_5$ olefin fraction of this type are Wingtack TM 95 and Wingtack TM 115 tackifying resins available from Goodyear Tire and Rubber Co. Other hydrocarbon resins include Regalrez TM 1078 and Regalrez TM 1126 available from Hercules Chemical Co., Inc., Escorez TM resins available from Exxon Chemical Co., and Arkon TM P115 available from Arakawa Chemical Co.

The tackifying resin may contain ethylenic unsaturation. However, saturated tackifying resins are preferred for those applications where oxidation resistance is important. The total amount of tackifying resin in the PSA of the invention preferably is from 0 to 150 parts, more preferably 5 to 50 parts and most preferably 25 to 35 parts by weight per 100 parts of moisture-curable α-olefin polymer.

The use of diluent in the novel PSA is desirable from the standpoint of processing. Illustrative of the inert diluents which may be employed are vegetable oils, mineral oils such as napthenic and paraffinic distillates, and esters such as dibutyl phthalate, dioctyl phthlate, dioctyl adipate. Between 0 and about 300 parts by weight of diluent, based on 100 parts by weight of the novel silyl-substituted α-olefin polymer, can be employed.

The PSA of this invention is typically prepared by blending components in any order employing conventional mixing apparatus. In order to avoid premature cure of the blends, they should be stored either under nitrogen or under low humidity conditions.

The PSA of the present invention forms strong bonds to a wide variety of materials such as plastic films, glass, and monomolecular oxide layers of metal substrates such as steel and aluminum. Extremely thin coatings (e.g., on the order of 0.1 to 10 μm) of the novel PSA can function as polymeric coupling agents. For example, glass beads or microbubbles that are to be used as a filler for a resinous body can be provided with ultrathin coatings of the novel PSA to enhance the integrity of that body. In doing so, the Si—O—Si crosslinked network includes Si atoms of the glass, while the nonpolar moiety of the novel PSA bonds to the resinous body. Because of this dual functionability of the novel PSA, a cellulose or concrete substrate that is filled with plastic particles such as plastic bubbles can have enhanced integrity when the plastic particles have ultrathin coatings of the novel PSA. Other filler particles which can adhere more strongly to a matrix when treated with ultrathin coatings of the novel PSA include fumed silica and metal oxides such as zirconia, alumina, and titanium dioxide.

The novel PSA can be used in combination with conventional polar PSAs to afford exceedingly strong bonds between plastics and metals. For such uses, an acrylate PSA can be coated onto a release liner, and a layer of the novel PSA can be hot-melt coated onto the acrylate coating. The exposed face of the resulting double-coated transfer tape can be adhered to a plastic body side molding. Then after stripping off the liner, the acrylate PSA coating can bond the body side molding to a painted automobile. The same result can be achieved by applying layers of the novel PSA and acrylate PSA to opposite sides of a flexible carrier film, e.g., fiberglass, ceramic, metal, or polymeric, which becomes part of the final assembly.

Objects and advantages of this invention are further illustrated by the following examples, but the particular materials and amounts thereof recited in these examples, as well as other conditions and details, should not be construed to unduly limit this invention.

EXAMPLES

Test Methods

The test procedures used in the examples to evaluate and compare the properties of the PSA compositions and tapes made from them are industry standard tests. These tests are described in detail in various publications of the American Society for Testing Materials (ASTM), Philadelphia, PA and the Pressure Sensitive Tape Council (PSTC), Glenview IL. References to these standards are also given.

Shear Strength (ASTM D-3654-78; PSTC - 7)

Shear strength is a measure of the cohesiveness or internal strength of an adhesive. It is based upon the amount of force required to pull an adhesive strip from a standard flat surface in a direction parallel to the surface to which it has been affixed with a definite pressure. It is measured in units of time (minutes) required to pull a standard area of PSA coated sheet material from a stainless steel test panel under stress of a constant, standard load.

The tests are conducted on adhesive coated strips applied to a stainless steel panel such that a 12.7 mm by 12.7 mm portion of each strip is in firm contact with the panel with one end portion of the tape being free. The panel with coated strip attached is held in a rack such that the exposed face of the backing of the strip forms an angle of 182° at the edge of the panel when a mass is applied as a hanging weight from the free end of the coated strip. The 2° greater than 180° is used to negate peel forces, thus ensuring that only the shear forces are measured to determine the holding power of the tape being tested. The time elapsed for each test specimen to separate from the steel panel is recorded as the shear strength.

The time at which the mass falls (average of two specimens) is called "Shear at RT" (when measured at room temperature) or "Shear at 70° C." (when measured at 70° C.). When reported as "1000+", the tape had not failed after minutes. The mode of failure is indicated as follows:

pp=Pop-off, i.e., 75–100% adhesive failure from steel sp=Adhesive split leaving >25% residue on each surface The pop-off failure mode is indicative of adhesive failure of the adhesive/steel interfacial bond as opposed to cohesive failure of the adhesive.

Peel Value [ASTM D 3330-78; PSTC - 1 (11/75)]

The peel adhesion is the force required to remove a PSA coated test specimen from a test panel measured at a specific angle and rate of removal. In the examples, this force is expressed in Newtons per decimeter width (N/dm) of coated sheet. The procedure followed is:

1) A test specimen 12.7 mm wide is applied to a horizontally positioned clean glass test plate. A 2.2 kg rubber roller is used to press a 12.7 cm length of specimen into firm contact with the glass surface.

2) The free end of the specimen is doubled back nearly touching itself so the angle of removal is 180°. The free end is attached to the adhesion tester scale.

3) The glass test plate is clamped in the jaws of tensile testing machine which moves the plate away from the scale at a constant rate of 2.3 meters per minute.

4) The scale reading in Newtons ("Peel Value") is recorded as the tape is peeled from the glass surface.

Removal Test

Used in this test is an aluminum panel, the test surface of which has a paint to which masking tapes are adhered with difficulty, e.g., the paint is an automotive basecoat/clearcoat (BC/CC) acrylic enamel paint system or the automotive 50J ™ acrylic enamel paint of Ford Motor Co.

Tapes are adhered at room temperature by their adhesives to the test surface, followed by two passes of a 4.5-pound (2-kg) rubber-coated metal roller. After one hour in an air-circulating oven at either 121° C. or 150° C., the tape is peeled back while hot at an angle of 45° at an approximate rate of 1.9 m/min. across half of the panel. After cooling to room temperature, the tape is peeled from the other half of the panel. The panel is examined visually for any adhesive residue.

Polymers 1–3 illustrate the above-outlined "first method" of making a moisture-curable α-olefin polymer of the invention; Polymers 4–9, the "second method"; Polymers 10–11, the "third method"; and Polymers 12–15, the "fourth method".

Polymer No. 1: Synthesis of Poly(1-hexene-cotriethoxyoct-7-enylsilane) (99.5:0.5 mol ratio)

The following reactants were charged in the order named to a dry, argon-filled, circulating-water-jacketed glass reactor equipped with stirrer and dry ice condenser: 100 g of toluene, 20 g of 1-hexene (Gulftene-6 ™ available from Gulf Oil) which had been passed through alumina/silica to remove impurities and then dried over molecular sieves), 0.27 g of triethoxyoct-7-enylsilane and 0.0194 g of activated aluminum titanium trichloride (AATiCl$_3$ ™ catalyst from Stauffer Chemical Co.) (1.26 10$^{-3}$ mole). Copolymerization was initiated by the slow addition of 1.1 ml (1.96×10$^{-3}$ mole) of diethylaluminum chloride of 1.8 M in toluene. Within 5 minutes the polymer became insoluble and hence unusable, probably due to hydrolysis of alkoxysilane groups in the presence of Lewis acid catalyst.

The gellation could have been avoided by replacing the ethoxysilane with a higher alkoxysilane such as an isopropoxysilane or a t-butoxysilane. Even then, the hydrolysis and crosslinking would proceed slowly.

Polymer No. 2: Synthesis of Poly(1-hexene-codimethylchloroct-7-enylsilane) (99.5:0.5 mole ratio)

The reaction was carried out in the same way as in Example 1 except using 20 g of 1-octene and 0.21 g of dimethylchloroct-7-enylsilane in toluene in the presence of diethylaluminum chloride and "AATiCl$_3$" catalyst in 1:1 molar ratio. After polymerization, the reactants were precipitated in methanol to convert the chlorosilane to the corresponding methoxysilane.

Polymer No. 3: Synthesis of Poly(1-hexene-co-[bicyclo(2.2.1)hept-5-en-2-yl]methyldichlorosilane) (99.5/0.5 mole ratio)

The reaction was carried out in the same manner as in Example 1 except using 20 g of 1-octene and 0.3 g of [bicyclo(2.2.1)hept-5-en-2-yl]methyldichlorosilane in toluene in the presence of diethylaluminum chloride and "AATiCl$_3$" catalyst in 1:1 molar ratio. After polymerization the reactants were precipitated in methanol to convert the chlorosilane to the corresponding methoxysilane.

Polymer No. 4

50 g of 1-hexene-co-1,7-octadiene copolymer (97:3 mole ratio) was prepared using the procedure for Polymer No. 1 except using 1,7-octadiene instead of the silane having an inherent viscosity in heptane of 1.9 dl/gm was dissolved in 500 g of toluene. This was refluxed under nitrogen, and about 20 ml of toluene was distilled out to ensure the removal of the water in the system. 2.9 g of triethoxysilane and 100 ppm of bis(-divinyltetramethyldisiloxane)platinum(0) catalyst were added. The reaction was run for 48 hours. Progress of the reaction was monitored by spectral analysis. At the end of the reaction, the copolymer was precipitated in dry methanol under anhydrous conditions. The silyl moiety of the copolymer was found by spectral analysis to be 2.7 mole %.

Polymer No. 5

Polymer No. 4 was repeated except using 1.45 g of the triethoxysilane. The reaction was refluxed for 40 hours for completion of the reaction. The silyl moiety of the copolymer was found by spectral analysis to be 1.2 mole %.

Polymer No. 6

Polymer No. 4 was repeated except using 0.73 g of the triethoxysilane. The reaction was refluxed for 40 hours for completion of the reaction. The silyl moiety of the copolymer was found by spectral analysis to be 0.63 mole %.

Polymer No. 7

Polymer No. 4 was repeated except using 2.4 g of the diethoxymethylsilane. The reaction was refluxed for 72 hours for completion of the reaction. The silyl moiety of the copolymer was found by spectral analysis to be 1.2 mole %.

Polymer No. 8

50 g of 1-octene-co-1,7-octadiene (97:3 mole ratio) copolymer was prepared using the procedure of Polymer No. 4 except that 1-octene was used instead of 1-hexene and had an inherent viscosity in heptane of 2.1 dl/gm and was dissolved in 500 g of toluene. This was refluxed under nitrogen, and about 20 ml of toluene was distilled out to ensure complete removal of water in the system. 2.2 g of triethoxysilane and 100 ppm of the same catalyst as used in Polymer No. 4 were added. The reaction was run for 72 hours. Progress of the reaction was checked by spectral analysis. The silyl moiety of the copolymer was found by spectral analysis to be 2.8 mole %.

Polymer No. 9

50 g of octene-co-1,7-octadiene (97:3 mole ratio) copolymer, prepared as described above, with an inherent viscosity in heptane of 2.1 dl/gm was dissolved in toluene. The solution was flushed with nitrogen for an hour followed by distillation of 20 ml of toluene to ensure no moisture present in the system. 2.0 g of benzoyl peroxide and 2.2 g of triethoxysilane were added, and the mixture was refluxed for 72 hours. The progress of the reaction was checked by spectral analysis. The silyl moiety of the copolymer was found by spectral analysis to be 1.4 mole %.

Polymer No. 10

30 g of hexene-co-1,7-octadiene (97:3) copolymer, prepared as described above, with an inherent viscosity in heptane of 1.9 dl/gm was dissolved in toluene. The solution was flushed with nitrogen for an hour followed by distillation of 20 ml of toluene to ensure no moisture present in the system. 2.08 g of mercaptopropyltrimethoxysilane and 1.5 g of azobisisobutyronitrile were added, and the mixture was refluxed for 18 hours. The progress of the reaction was checked by spectral analysis. The silyl moiety of the copolymer was found by spectral analysis to be 1.9 mole %.

Polymer No. 11

30 g of hexene-co-1,7-octadiene (97:3) copolymer, prepared as described above, with an inherent viscosity in heptane of 1.9 dl/gm was dissolved in toluene. The solution was flushed with nitrogen for an hour followed by distillation of 20 ml of toluene to ensure no moisture present in the system. 1.04 g of mercaptopropyltriethoxysilane and 0.6 g of benzophenone photoinitiator were added, and the mixture was photoirradiated for 15 hours. The polymer underwent gellation during the reaction.

Polymer No. 12

Hexene-co-propylene (60:40 mole ratio) copolymer, prepared as described above, was adducted with 3.8 mole % of maleic anhydride 50 g of this adduct, which had a melt viscosity of 9840 cp at 190° C., was dissolved in 150 g of toluene. This was refluxed for two hours in inert atmosphere, and a small portion of toluene was distilled to remove any water in the system. The mixture was reacted with 1 g of aminopropyltriethoxysilane at room temperature for 3 hours followed by refluxing for another two hours to ensure the completion of the reaction.

Polymer No. 13

50 g of the adduct of Polymer No. 12 was dissolved in 150 g of toluene. This was refluxed under nitrogen for two hours, and a small portion of toluene was distilled to remove any water in the system. 1 g of isocyanatopropyltriethoxysilane was added to the solution. The contents were heated at 60°-65° C. for about three hours for the reaction to complete.

Polymer No. 14

The procedure for making Polymer No. 12 was repeated except that the hexene-propylene copolymer was converted to an adduct with 1.2 mole % of maleic anhydride (melt viscosity of 7680 cp at 190° C.).

Polymer No. 15

50 g of the adduct of Polymer No. 12 was dissolved in 150 g of toluene. This was refluxed for three hours under nitrogen, and a small portion of toluene was distilled to remove any water in the system. The mixture was reacted with 3 g of aminopropyltriethoxysilane at room temperature for three hours followed by refluxing for another two hours to ensure the completion of the reaction.

Comparative Polymer Nos. C-1 through C-4 (prepared as described above)

C-1 Copolymer of hexene-co-1,7-octadiene (97:3 mole ratio)

C-2 Copolymer of octene-co-1,7-octadiene (97:3 mole ratio)

C-3 Copolymer of hexene-co-propylene (60:40 mole ratio) adducted with 3.8 mole % maleic anhydride C-4 Copolymer of hexene-co-propylene (60:40 mole ratio) adducted with 1.2 mole % maleic anhydride

EXAMPLES 1–38

Preparation of Pressure-Sensitive Adhesive Tapes

Each of Polymers No. 3–15 and of Comparative Polymers No. C-1 to C-4 was formulated into a pressure-sensitive adhesive by solution blending in toluene: the copolymer, 25 phr (parts per hundred parts of polymer) of a synthetic hydrocarbon tackifier resin, and 1.0 phr stabilizer (Irganox TM 1010). Each blend was knife coated at a thickness of 25 µm onto 38-µm biaxially oriented poly(ethyleneterephthlate) film. The coating was dried for minutes at 150° F. (65° C.) and conditioned for 24 hours at 90% humidity. Some of the adhesive compositions were also made adding 1% of dibutyltin dilaurate catalyst in order to examine the efficacy of hydrolysis of alkoxysilyl groups under the humid conditions.

Tackifiers used in the PSA formulations were:

A Wingtack 115 TM
B Regalrez TM 1126
C Arkon TM P115

Tape testing was carried out according to the test methods previously described, and the results are detailed in Tables I, II and III.

TABLE I

PSA Properties of PSA Tapes Made from Polymers 3-15 and Comparative Polymers

| Example | Polymer No. | Tin Cat. | Tackifier | Peel Value (N/dm) | Shear at RT (1 Kg) (Min.) | MOF* |
|---|---|---|---|---|---|---|
| 1 | 3 | — | — | 24 | 30 | sp |
| 2 | 3 | 1 | — | 20 | 52 | pp |
| 3 | 3 | 1 | A | 65 | 340 | sp |
| 4 | 4 | — | — | 18 | 19 | pp |
| 5 | 4 | 1 | — | 16 | 55 | pp |
| 6 | 4 | 1 | A | 62 | 185 | pp |
| 7 | 4 | 1 | B | 65 | 1,239 | sp |
| 8 | 4 | 1 | C | 58 | 1,540 | sp |
| 9 | 6 | — | — | 23 | 24 | pp |
| 10 | 6 | 1 | — | 20 | 99 | pp |
| 11 | 6 | 1 | A | 59 | 145 | pp |
| 12 | 6 | 1 | B | 62 | 542 | sp |
| 13 | 8 | — | — | 19 | 10 | sp |
| 14 | 8 | 1 | — | 13 | 54 | pp |
| 15 | 8 | 1 | A | 49 | 134 | pp |
| 16 | 8 | 1 | B | 53 | 234 | pp |
| 17 | 8 | 1 | C | 51 | 138 | pp |
| 18 | 10 | 1 | — | 19 | 102 | pp |
| 19 | 10 | 1 | A | 64 | 1,000+ | |

TABLE I-continued

PSA Properties of PSA Tapes Made from Polymers 3-15 and Comparative Polymers

| Example | Polymer No. | Tin Cat. | Tackifier | Peel Value (N/dm) | Shear at RT (1 Kg) (Min.) | MOF* |
|---|---|---|---|---|---|---|
| 20 | 10 | 1 | B | 58 | 2,534 | |
| 21 | 10 | 1 | C | 62 | 1,345 | |
| 22 | 13 | — | — | 59 | 93 | pp |
| 23 | 13 | 1 | — | 53 | 247 | pp |
| 24 | 13 | — | B | 97 | 1,357 | sp |
| 25 | 13 | 1 | B | 72 | 9,420 | |
| 26 | 15 | — | — | 59 | 206 | pp |
| 27 | 15 | 1 | — | 57 | 2,678 | pp |
| 28 | 15 | — | B | 88 | 994 | |
| 29 | 15 | 1 | B | 66 | 1,771 | |
| 30 | C-1 | | | 29 | 5 | sp |
| 31 | C-2 | | | 16 | 1 | sp |
| 32 | C-3 | | | 71 | 85 | sp |
| 33 | C-4 | | | 63 | 65 | sp |

*MOF = Mode of Failure
sp = split (cohesive); pp = pop-off(adhesive)

The data in Table I show significant improvements in PSA properties can be achieved when using Polymers 2-12, and 14-29 as compared to Comparative Polymers C-1 to C-4. Where MOF failure was split (cohesive) and shear values were less than 100, the value of a polymer as a PSA was low. Upon crosslinking, the MOF changed to pop-off (adhesive failure) which is evidence of significant improvement in internal strength.

TABLE II

Shear Properties of PSA Tapes at Elevated Temperatures

| | | | Shear at 70° C. (min) | | |
|---|---|---|---|---|---|
| Example | Polymer No. | Tackifier | 200 g | 500 g | 1000 g |
| 34 | 4 | C | 235 | 74 | 10 |
| 35 | 6 | B | 175 | 68 | 9 |
| 36 | 8 | B | 583 | 246 | 103 |
| 37 | C-1 | C | 5 | <1 | <1 |
| 38 | C-3 | B | 10 | 5 | <1 |

The data in TABLE II show improved shear strength at elevated temperature for polymers of the invention comprising tackifier compared to comparative samples with tackifier.

TABLE III

Removal Test

| | Residue left on BC/CC Panel after 60 min. at | | Residue left on 50J Panel after 60 min. at | |
|---|---|---|---|---|
| Example | 121° C. | 150° C. | 121° C. | 150° C. |
| 4 | 5% | 5% | 10% | 25% |
| 5 | 0 | 0 | 0 | 0 |
| 6 | 0 | 2% | 0 | 0 |
| 7 | 0 | 5% | 0 | 10% |
| 8 | 0 | 0 | 0 | 2% |
| 12 | 10% | 50% | 25% | 100% |
| 13 | 0 | 2% | 0 | 5% |
| 14 | 0 | 0 | 0 | 0 |
| 15 | 0 | 0 | 0 | 0 |
| 16 | 0 | 5% | 2% | 10% |
| 17 | 0 | 0 | 0 | 0 |
| 18 | 10% | 50% | 25% | 100% |
| 19 | 10% | 25% | 10% | 75% |
| 20 | 5% | 50% | 10% | 75% |
| 21 | 5% | 15% | 10% | 25% |
| 22 | 100% | 100% | 100% | 100% |
| 23 | 75% | 75% | 100% | 100% |
| 26 | 15% | 25% | 25% | 75% |
| 27 | 0 | 5% | 0 | 2% |
| 29 | 0 | 0 | 0 | 0 |
| 30 | 100% | 100% | 75% | 100% |
| 31 | 75% | 90% | 75% | 100% |
| 32 | 100% | 100% | 100% | 100% |
| 33 | 100% | 100% | 75% | 100% |

The data in TABLE III show that crosslinked polymers performed better than non-crosslinked polymers in the experimental removal test. Up to 10 percent residue is considered acceptable.

A tin catalyst was not employed with Comparative Polymers C-1 to C-4, because it would not have had any beneficial effect in the absence of alkoxysilyl groups.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method of preparing a pressure-sensitive adhesive comprising the steps of
   a) polymerizing a $C_6$ to $C_{14}$ α-olefin monomer with a conjugated diene using Ziegler-Natta catalyst to produce a copolymer containing ethylenically-unsaturated chains,
   b) optionally, blending at least one of a hydrated salt and a tackifying agent with said copolymer, and
   c) in the presence of an effective amount of a hydrosilation catalyst, hydrosilating the ethylenic unsaturation with a hydrosilane of the formula $HSiR_pX_{(3-p)}$ wherein
   R is a hydrocarbyl group selected from alkyl groups having 1 to 18 carbon atoms, aryl groups having 6 to 8 carbon atoms, and cycloalkyl groups having 5 to 8 carbon atoms;
   p is zero, one or two, and
   X is a hydrolyzable or condensable group selected from hydrogen, hydroxyl, hydrocarbyloxy, hydrocarbonyloxy, and halogen to produce a moisture-curable α-olefin polymer having a weight average molecular weight of at least 30,000.

2. The method as defined in claim 1 wherein step a) is carried but in the presence of hydrogen to restrict the inherent viscosity in toluene of the copolymer to at most 3 dl/g.

3. The method as defined in claim 1 and comprising the subsequent step of
   c) hot-melt coating the moisture-curable α-olefin polymer onto at least one surface of a flexible backing to produce a pressure-sensitive adhesive tape.

4. The method as defined in claim 3 further comprising the step of
   d) exposing the pressure-sensitive adhesive coating to moisture to form a Si—O—Si crosslinked network.

5. The method as defined in claim 4 wherein carried out at a relative humidity of at least 50% and a temperature of from 30° to 100° C..

6. A method of making a pressure-sensitive adhesive comprising the steps of
   polymerizing a $C_9$ to $C_{14}$ α-olefin monomer with a nonconjugated diene using Ziegler-Natta catalyst to produce a copolymer containing ethylenically-unsaturated chains, b) optionally, blending at least one of a hydrated salt and a tackifying agent with said copolymer, and c) in the presence of an effective amount of an initiator or by UV radiation in the presence of an effective amount of a photoinitiator, reacting the side chains with a mercaptoalkylalkoxysilane to produce a moisture-curable α-olefin polymer having a weight average molecular weight of at least 30,000.

7. A method of making a pressure-sensitive adhesive comprising the steps of a) polymerizing a $C_6$ to $C_{14}$ α-olefin monomer with a nonconjugated diene using an effective amount of a Ziegler-Natta catalyst to produce a copolymer containing ethylenically-unsaturated chains, b) optionally, blending at least one of a hydrated salt and a tackifying agent with said copolymer, and c) reacting the resulting α-olefin polymer with a hydrosilane in the presence of an effective amount of a hydrosilation catalyst to produce a moisture-curable α-olefin polymer having a weight average molecular weight of at least 30,000.

8. A method of making a pressure-sensitive adhesive comprising the steps of a) polymerizing a $C_6$ to $C_{14}$ α-olefin monomer alone or with an α-olefin monomer or with a nonconjugated diene using an effective amount of a Ziegler-Natta catalyst to product a homopolymer or a copolymer containing ethylenically-unsaturated chains, b) optionally, blending at least one of a hydrated salt and a tackifying agent with said copolymer.

c) reacting the resulting α-olefin polymer with maleic anhydride in the presence of an effective amount of an initiator to produce an adduct, and d) reacting the maleated α-olefin polymer adduct with aminoalkylalkoxysilane or with isocyanatoalkylalkoxysilane to produce a moisture-curable α-olefin polymer having a weight average molecular weight of at least 30,000.

9. The method as defined in claim 8 wherein the moisture-curable α-olefin polymer is blended with at least one hydrated salt.

10. The method as defined in claim 8 wherein the moisture-curable α-olefin polymer is blended with a tackifying resin.

11. A method of making a pressure-sensitive adhesive comprising the steps of:

a) polymerizing a $C_6$ to $C_{14}$ α-olefin monomer alone or with up to 40 mole % of one or more $C_2$ to $C_5$ α-olefin monomers using a Ziegler-Natta catalyst to produce a saturated homopolymer or a saturated or unsaturated copolymer, b) optionally, blending at least one of a hydrated salt with a tackifying agent with said copolymer, c) reacting maleic anhydride with aminoalkylalkoxysilane or with isocyanatoalkylalkoxysilane to produce imidoalkylalkoxysilane, and d) reacting the α-olefin polymer produced in step a) with the imidoalkoxysilane in the presence of an initiator to provide said pressure-sensitive adhesive.

12. The method according to claim 11 wherein said pressure-sensitive adhesive comprises a tacky moisture-curable copolymer comprising a polymeric alpha-olefin backbone and having the formula

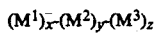

wherein x, y, and z are numbers designating the relative molar amounts of $M^1$, $M^2$, and $M^3$ units that are randomly located in the backbone chain of the polymer such that the polymer has a weight average molecular weight of at least 30,000, x is at least 60% of $x+y$, and z is 0.1 to 10% of $x+y+z$;

$M^1$ is a divalent unit present in a polymer formed on polymerization of an α-olefin having 6 to 14 carbon atoms;

$M^2$ is a saturated or unsaturated divalent unit present in a polymer formed by polymerization or an ethylenically-unsaturated hydrocarbon selected from α-olefins having 2 to 14 carbon atoms, non-conjugated dienes having 5 to 20 carbon atoms, and non-conjugated mono- and polyethylenically-unsaturated mono- and polycyclic hydrocarbons having 6 to 20 carbon atoms;

$M^3$ is the same as $M^2$ but is substituted by a hydrolyzable or condensable silyl group;

said copolymer when cured being tacky and having a weight average molecular weight of at least 50,000.

* * * * *

UNITED STATES PATENT AND TRADEMARK OFFICE
CERTIFICATE OF CORRECTION

PATENT NO. : 5,296,561
DATED : March 22, 1994
INVENTOR(S) : Gaddam N. Babu, James R. Peterson and Sehyun Nam It is certified that error appears in the above-indentified patent and that said Letters Patent is hereby corrected as shown below:

Col. 1, line 45   "P$As" should read -- PSAs --

Col. 3, formula II

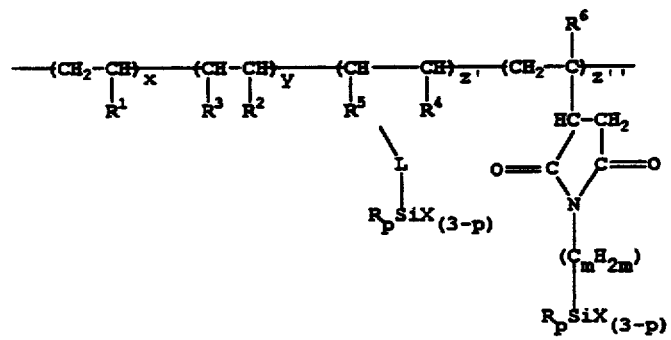

should read

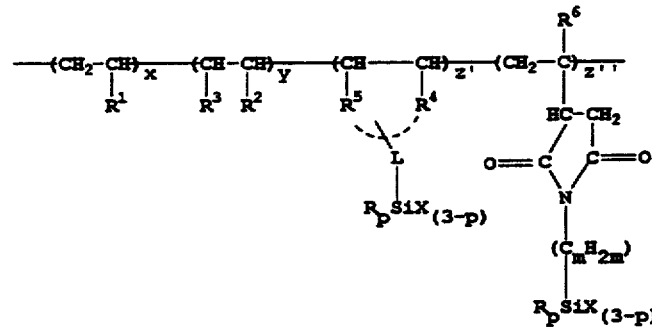

UNITED STATES PATENT AND TRADEMARK OFFICE
CERTIFICATE OF CORRECTION

PATENT NO. : 5,296,561
DATED : March 22, 1994
INVENTOR(S) : Gaddam N. Babu, James R. Peterson and Sehyun Nam It is certified that error appears in the above-indentified patent and that said Letters Patent is hereby corrected as shown below:

Col. 9, lines 10-13

"$CaSO_4.5H_2O$, $MgSO_4.7H_2O$, $BaSO_4.2H_2O$, $(CH_3COO)_2Ba.2H_2O$, $BaCl_2.2H_2O$, $CaSO_4.2H_2O$, $Na_2B_4O_7.10H_2O$, $AlNH_4(SO_4)_2.12H_2O$, $Al(OH)_3.XH_O$, $Al(NO3)3.9H_2O$, and $Al_2(SO_4)_3.16H_2O$."

should read

--$CaSO_4 \bullet 5H_2O$, $MgSO_4 \bullet 7H_2O$, $BaSO_4 \bullet 2H_2O$, $(CH_3COO)_2Ba \bullet 2H_2O$, $BaCl_2 \bullet 2H_2O$, $CaSO_4 \bullet 2H_2O$, $Na_2B_4O_7 \bullet 10H_2O$, $AlNH_4(SO_4)_2 \bullet 12H_2O$, $Al(OH)_3 \bullet XH_2O$, $Al(NO_3)_3 \bullet 9H_2O$, and $Al_2(SO_4)_3 \bullet 16H_2O$.--

Col. 10, line 17   "P$A" should read -- PSA --

Col. 11, line 7    "after minutes." should read -- after 1000 minutes. --

Col. 12, line 10   "Poly(1-hexene-codime-" should read
                   -- Poly(1-hexene-co-dime- --

Col. 14, line 34   "for minutes" should read -- for 5 minutes --

Col. 16, line 27   "conjugated" should read -- nonconjugated --

UNITED STATES PATENT AND TRADEMARK OFFICE
CERTIFICATE OF CORRECTION

PATENT NO. : 5,296,561
DATED : March 22, 1994
INVENTOR(S) : Gaddam N. Babu, James R. Peterson and Sehyun Nam It is certified that error appears in the above-indentified patent and that said Letters Patent is hereby corrected as shown below:

Col. 16, line 60  "wherein carried" should read
-- wherein step d) is carried --

Col. 16, line 65  "polymerizing a $C_9$" should read --a) polymerizing a $C_6$--.

Col. 18, line 35  "or" should read -- of --

Signed and Sealed this

Twenty-seventh Day of September, 1994

Attest:

BRUCE LEHMAN

Attesting Officer  Commissioner of Patents and Trademarks